US009030533B2

(12) United States Patent
Aubey, Jr. et al.

(10) Patent No.: US 9,030,533 B2
(45) Date of Patent: May 12, 2015

(54) STEREOSCOPIC OVERLAY OFFSET CREATION AND EDITING

(75) Inventors: Robert Aubey, Jr., McFarland, WI (US); Peter Avventi, Madison, WI (US); Dennis Adams, Madison, WI (US); Yoshikazu Takashima, Los Angeles, CA (US); John Ying, Redondo Beach, CA (US); Tommy Choy, Lakewood, CA (US); George Reis, Los Angeles, CA (US); Michael Thompson, Los Angeles, CA (US); Kiruthika Krishnadevarajan, Rancho Palos Verdes, CA (US); Don C. Eklund, II, Yorba Linda, CA (US)

(73) Assignees: Sony Corporation, Tokyo (JP); Sony Corporation of America, New York, NY (US); Sony Pictures Entertainment Inc., Culver City, CA (US)

( * ) Notice: Subject to any disclaimer, the term of this patent is extended or adjusted under 35 U.S.C. 154(b) by 352 days.

(21) Appl. No.: 12/938,271

(22) Filed: Nov. 2, 2010

(65) Prior Publication Data

US 2011/0109730 A1     May 12, 2011

Related U.S. Application Data

(60) Provisional application No. 61/259,021, filed on Nov. 6, 2009, provisional application No. 61/285,120, filed on Dec. 9, 2009, provisional application No. 61/285,485, filed on Dec. 10, 2009.

(51) Int. Cl.
*H04N 13/04* (2006.01)
*H04N 13/00* (2006.01)

(52) U.S. Cl.
CPC ......... *H04N 13/007* (2013.01); *H04N 13/0456* (2013.01)

(58) Field of Classification Search
CPC .......................... H04N 13/0456; H04N 13/007
USPC ........................ 348/51, 43; 345/426; 382/154

IPC .......................................................... H04N 13/04
See application file for complete search history.

(56) References Cited

U.S. PATENT DOCUMENTS 7,336,277 B1 *  2/2008  Clark et al. ................... 345/426
2002/0075275 A1  6/2002  Togo et al.
(Continued)

FOREIGN PATENT DOCUMENTS

CN           1795683 A       6/2006
CN         101013507 A       8/2007
(Continued)

OTHER PUBLICATIONS

International Search Report and Written Opinion dated Jul. 19, 2011 from International Patent Application No. PCT/US2010/055168, 10 pages.
(Continued)

*Primary Examiner* — Thao X Le
*Assistant Examiner* — Long Le
(74) *Attorney, Agent, or Firm* — Procopio, Cory, Hargreaves & Savitch, LLP

(57) ABSTRACT

Adjusting overlay positioning in stereoscopic video, including: receiving overlay data including a plurality of overlays, each overlay having a lateral axis value, a vertical axis value, and a depth value; receiving and displaying the stereoscopic video to a user as at least one of a video preview display and a stereoscopic display, each display including an overlay from the overlay data, wherein a position of the overlay in each display is based on the lateral axis value, the vertical axis value, and the depth value of the overlay, and wherein the video preview display includes interfaces for adjusting the position of the overlay in each display; receiving input from the user related to the depth value of the overlay; and adjusting the position of the overlay in the video preview display based on the input from the user.

20 Claims, 5 Drawing Sheets

(56) References Cited

U.S. PATENT DOCUMENTS

| | | |
|---|---|---|
| 2004/0125447 A1 | 7/2004 | Sato et al. |
| 2008/0226199 A1 | 9/2008 | Breglio |
| 2010/0220175 A1* | 9/2010 | Claydon et al. ............... 348/43 |
| 2011/0007962 A1* | 1/2011 | Johnson et al. ............... 382/154 |
| 2011/0128351 A1* | 6/2011 | Newton et al. ............... 348/43 |

FOREIGN PATENT DOCUMENTS

| | | |
|---|---|---|
| EP | 0735784 A2 | 10/1996 |
| EP | 0905988 A1 | 3/1999 |
| JP | H09-172654 | 6/1997 |
| JP | 2004274125 A | 9/2004 |
| JP | 2006-119653 A | 5/2006 |
| JP | 2006-166435 A | 6/2006 |
| KR | 10-2008-0105343 A | 12/2008 |
| WO | 2008044191 A2 | 4/2008 |
| WO | 2010010499 A1 | 1/2010 |
| WO | 2010099495 A2 | 9/2010 |

OTHER PUBLICATIONS

Extended European Search Report issued in copending EP Application No. 10828986.9 on Jul. 19, 2013 (7 pages).

* cited by examiner

STEREOSCOPIC OVERLAY OFFSET CREATION AND EDITING

CROSS-REFERENCE TO RELATED APPLICATIONS

This application claims the benefit of priority under 35 U.S.C. §119(e) of U.S. Provisional Patent Application No. 61/259,021, filed Nov. 6, 2009, entitled "STEREOSCOPIC SUBTITLE OFFSET CREATION AND EDITING," U.S. Provisional Patent Application No. 61/285,120, filed Dec. 9, 2009, entitled "STEREOSCOPIC SUBTITLE OFFSET CREATION AND EDITING," and U.S. Provisional Patent Application No. 61/285,485, filed Dec. 10, 2009, entitled "STEREOSCOPIC SUBTITLE OFFSET CREATION AND EDITING." The disclosures of the above-referenced applications are incorporated in their entirety herein by reference.

BACKGROUND

1. Field of the Invention

The present invention relates to a system for manipulating overlays in video content, and more specifically, to manipulating stereoscopic overlays for stereoscopic video.

2. Background

Subtitles are often added to video, such as a television program or movie. However, these subtitles and video are typically in a two-dimensional format. The use of two-dimensional subtitles for stereoscopic video can be problematic. Thus, a tool that supports stereoscopic subtitles will provide better control for the author and a more desirable resulting video sequence.

SUMMARY

Implementations of the present invention provide for adjusting the positioning of overlays in stereoscopic media.

In one implementation, a method of adjusting overlay positioning in stereoscopic video is disclosed. The method includes: receiving overlay data including a plurality of overlays, each overlay having a lateral axis value, a vertical axis value, and a depth value; receiving and displaying the stereoscopic video to a user as at least one of a video preview display and a stereoscopic display, each display including an overlay from the overlay data, wherein a position of the overlay in each display is based on the lateral axis value, the vertical axis value, and the depth value of the overlay, and wherein the video preview display includes interfaces for adjusting the position of the overlay in each display; receiving input from the user related to the depth value of the overlay; and adjusting the position of the overlay in the video preview display based on the input from the user.

In another implementation, an overlay positioning system to display overlay data in stereoscopic video is disclosed. The system includes: a video preview display area configured to display the stereoscopic video to a user as at least one preview image, the video preview display area including an overlay from the overlay data, wherein the position of the overlay in at least one preview image is based on a lateral axis value, a vertical axis value, and a depth value of the overlay; and an overlay adjustment interface configured to adjust the position of the overlay in at least one preview image based on an input from the user related to the depth value of the overlay.

In a further implementation, a non-transitory storage medium storing a computer program for adjusting overlay positioning in stereoscopic video is disclosed. The computer program includes executable instructions that cause a computer to: receive overlay data including a plurality of overlays, each overlay having a lateral axis value, a vertical axis value, and a depth value; receive and display the stereoscopic video to a user as at least one of a video preview display and a stereoscopic display, each display including an overlay from the overlay data, wherein a position of the overlay in said each display is based on the lateral axis value, the vertical axis value, and the depth value of the overlay, and wherein the video preview display includes interfaces for adjusting the position of the overlay in said each display; receive input from the user related to the depth value of the overlay; and adjust the position of the overlay in the video preview display based on the input from the user.

Other features and advantages of the present invention will become more readily apparent to those of ordinary skill in the art after reviewing the following detailed description and accompanying drawings.

DETAILED DESCRIPTION

Certain implementations as disclosed herein provide for positioning overlays in stereoscopic media. In one implementation, the overlays include graphical and text-based items. The graphical overlays include items such as graphical subtitles and menus. The text-based overlays include items such as text- or font-based subtitles.

After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

In stereoscopic media, subtitles can have x, y, and z components to their placement. The x and y components correspond to the lateral and vertical axis that are associated with standard, two-dimensional media. However, the z component, or depth, corresponds to the axis normal to the x and y axis. This depth component is not present in traditional two dimensional media. The depth position of subtitles in stereographic media can significantly affect the readability of such subtitles. For example, subtitles whose depth is too shallow may be buried by video or images that are perceived as extending closer to a user. Thus, it is desirable to provide a system for determining and setting appropriate depths for subtitles in stereoscopic media.

Figure 1A:
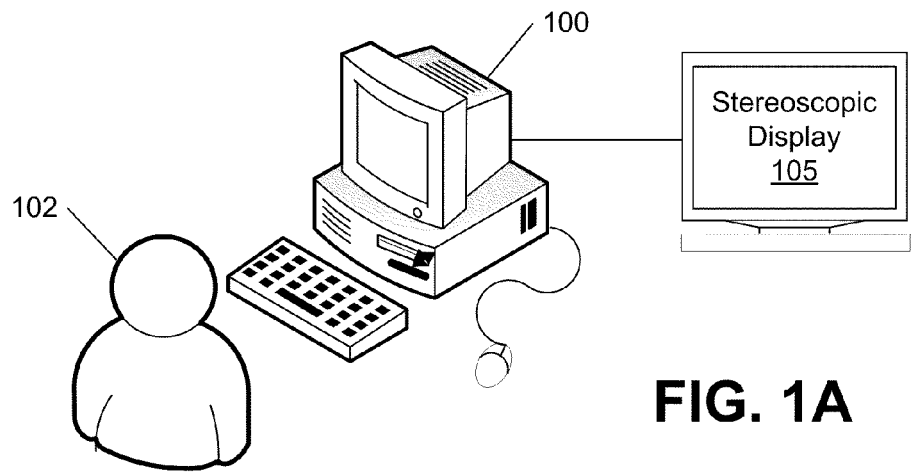
FIG. 1A illustrates a representation of a computer system and a user in accordance with one implementation of the present invention.

FIG. 1A illustrates a representation of a computer system 100, a user 102, and a stereoscopic display 105. The user 102 uses the computer system 100 to position overlays in stereoscopic media data as described herein. The user 102 uses the stereoscopic display 105 to view the result of the overlay positioning performed by the computer system 100. The user 102 may use glasses (not shown) or other devices in order to view the stereoscopic media on stereoscopic display 105. The computer system 100 stores and executes an overlay positioning system 190.

Figure 1B:
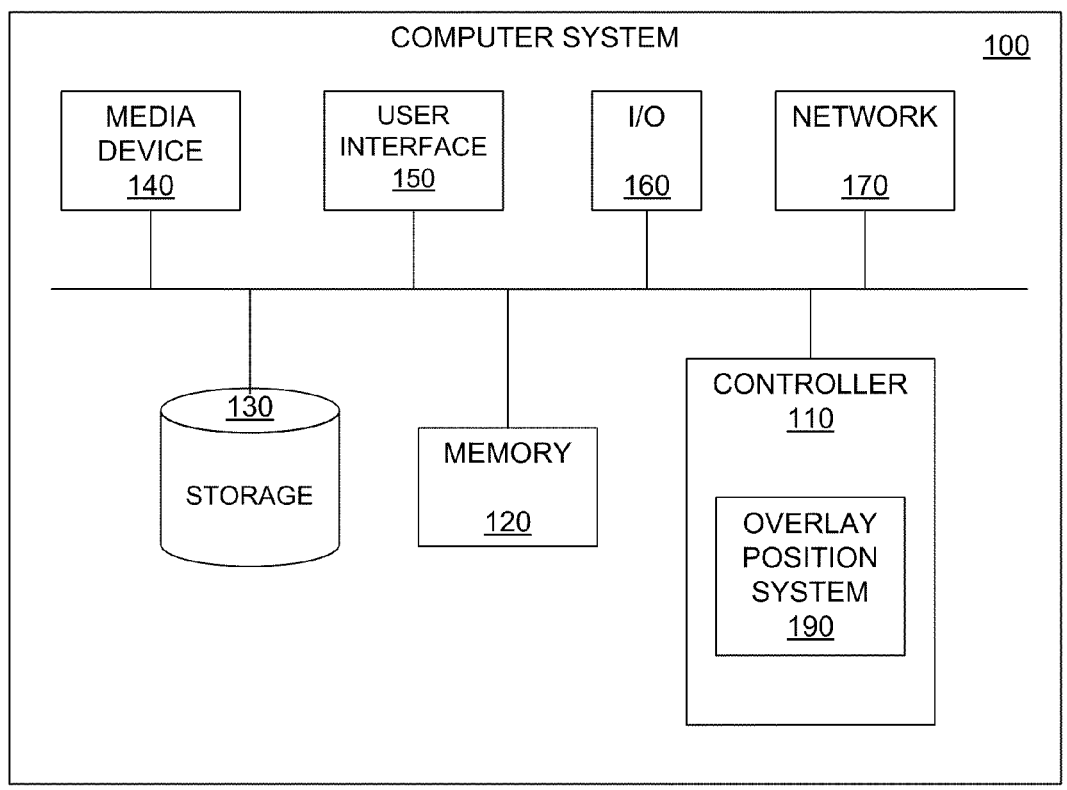
FIG. 1B is a functional block diagram illustrating the computer system hosting a subtitle placement system.

FIG. 1B is a functional block diagram illustrating the computer system 100 hosting the overlay positioning system 190. The controller 110 is a programmable processor and controls the operation of the computer system 100 and its components. The controller 110 loads instructions (e.g., in the form of a computer program) from the memory 120 or an embedded controller memory (not shown) and executes these instructions to control the system. In its execution, the controller 110 can provide the overlay positioning system 190 as a software system, such as to position overlays based on user input, automatically detect overlays that may need to be repositioned, or perform other tasks described herein. Alternatively, this service can be implemented as separate hardware components in the controller 110 or the computer system 100.

Memory 120 stores data temporarily for use by the other components of the computer system 100. In one implementation, memory 120 is implemented as RAM. In one implementation, memory 120 also includes long-term or permanent memory, such as flash memory and/or ROM.

Storage 130 stores data temporarily or long term for use by other components of the computer system 100, such as for storing data used by the overlay positioning system 190. In one implementation, storage 130 is a hard disk drive.

The media device 140 receives removable media and reads and/or writes data to the inserted media. In one implementation, for example, the media device 140 is an optical disc drive.

The user interface 150 includes components for accepting user input from the user of the computer system 100 and presenting information to the user. In one implementation, the user interface 150 includes a keyboard, a mouse, audio speakers, and a display. The controller 110 uses input from the user to adjust the operation of the computer system 100. User interface controllers are used in this implementation.

The I/O interface 160 includes one or more I/O ports to connect to corresponding I/O devices, such as external storage or supplemental devices (e.g., the stereoscopic display 105, a printer or a PDA). In one implementation, the ports of the I/O interface 160 include ports such as: USB ports, PCM-CIA ports, serial ports, and/or parallel ports. In another implementation, the I/O interface 160 includes a wireless interface for communication with external devices wirelessly.

The network interface 170 includes a wired and/or wireless network connection, such as an RJ-45 or "Wi-Fi" interface (including, but not limited to 802.11) supporting an Ethernet connection.

The computer system 100 includes additional hardware and software typical of computer systems (e.g., power, cooling, operating system), though these components are not specifically shown in FIG. 1B for simplicity. In other implementations, different configurations of the computer system can be used (e.g., different bus or storage configurations or a multi-processor configuration).

Figure 2:
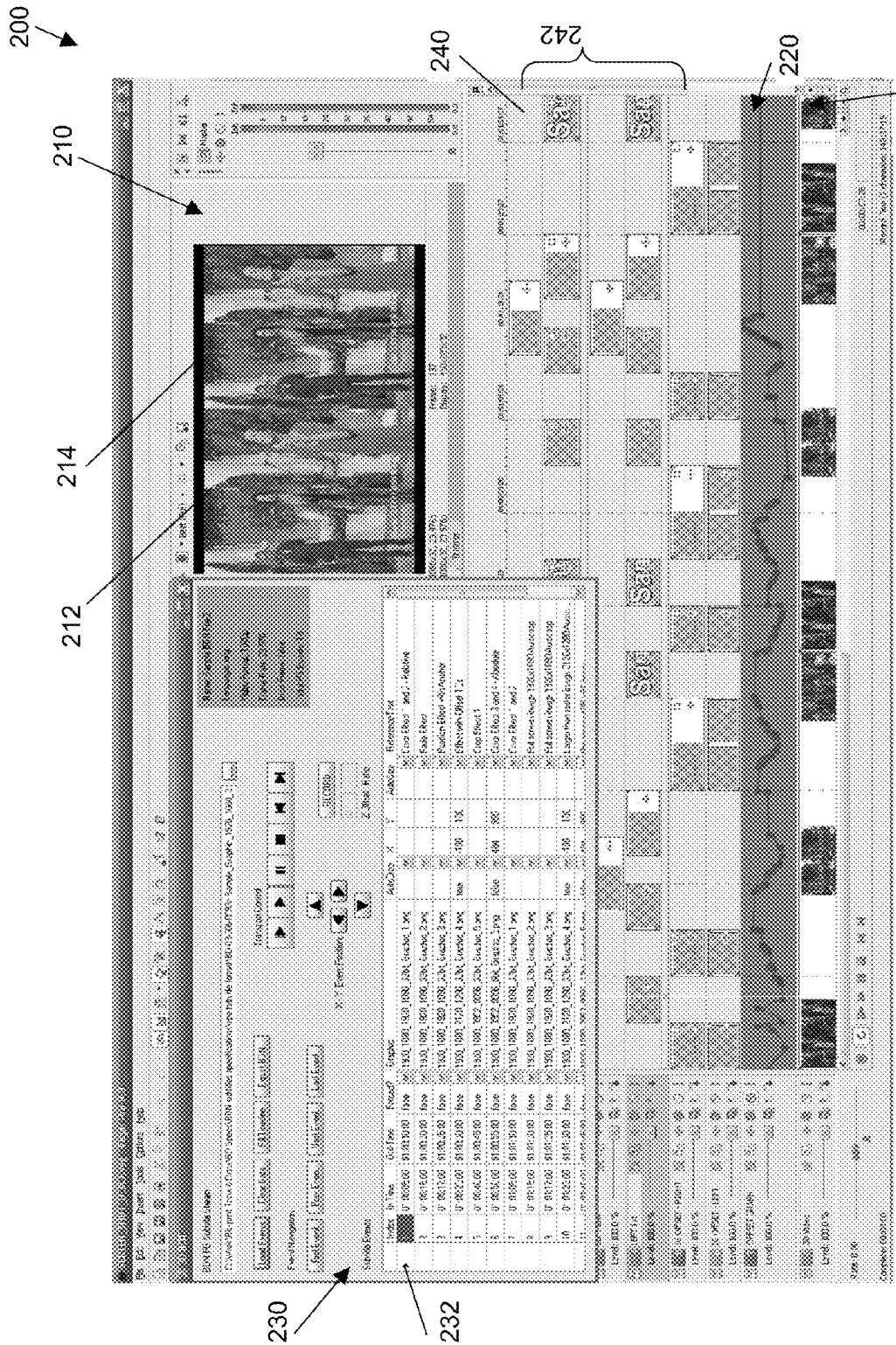
FIG. 2 illustrates a representation of an interface of a system for use in positioning subtitles in accordance with one implementation of the present invention.

FIG. 2 illustrates a representation of an interface 200 for an overlay positioning system in accordance with one implementation of the present invention. In particular, the representation is an example screen shot of a graphical user interface 200 for a subtitle positioning system. In one implementation, the interface 200 is displayed to a user on the computer system 100. The interface 200 comprises a video preview display area 210, a subtitle event table 230, and a subtitle offset graph 220.

In one implementation, the video preview display area 210 can display the video and overlay data in various different preview modes including side-by-side, top-bottom, checkerboard, left video and overlay data only, right video and overlay data only, and 3-D anaglyphic mode which requires the use of glasses with appropriate color filters. Thus, for example, the side-by-side mode includes two images provided adjacent to each other. The top-bottom mode includes two images provided vertically at the top and bottom. The 3-D anaglyphic mode includes two images provided on top of each other.

In the illustrated implementation of FIG. 2, the video preview display area 210 is configured as a side-by-side display comprising a left image area 212 and a right image area 214. In one example, stereoscopic media comprises pairs of images. Each image in a pair is alternatively displayed to one eye or the other of a user. The user's brain then combines the separate images into the perceived stereoscopic image. The video preview display area 210 displays the pair of images. The aspect ratio or other properties of the left and right images may be modified before presentation to a user. For example, the images may be squeezed to fit in a smaller area. Alternatively, the natural aspect ratios of the images may be used.

Where applicable, the left and right images contain an associated subtitle. The relative position of the subtitles within the left and right images affect the perceived depth of the subtitle when displayed to a user. For example, to increase the depth, i.e., have the subtitle appear further away from the user, the subtitles in the left and right images can be moved away from each other in their respective images. For example, the subtitle in the right image can be moved one pixel to the right and the subtitle in the left image can be moved one pixel to the left.

The video preview display provides a user with frame-by-frame visualization of the position of the subtitles in the stereoscopic media. Actual stereoscopic output of the stereoscopic media can be performed using the stereoscopic display 105 of FIG. 1.

The interface 200 also comprises a subtitle event table 230. The subtitle event table 230 describes one or more subtitle events. In one implementation, subtitles are represented as image files or text files. A subtitle event refers to a collection of information about when and how a particular subtitle is displayed. For example, the subtitle event table 230 comprises a subtitle event 232. The subtitle event 232 comprises an event index, a start time (also called an in-time), a stop time (also called an out-time), an identifier of the subtitle being displayed (e.g., a file name), as well as other information relating to the display of the subtitle. This other information can include, for example, cropping information, conditional display information, positioning information sizing information, and effect information. A user can navigate between subtitle events using the subtitle event table 230. In one implementation, when a particular subtitle event is selected, the stereoscopic frame corresponding to the start time of the subtitle event is displayed in the video preview display area 210.

The interface 200 further comprises a subtitle offset graph 220. As described above, each subtitle can be positioned in the x axis, the y axis, and the depth. The offset graph 220 shows the depth value for subtitles over time. As described below, the depth position of the subtitles can be altered. Changes to offset positions of the subtitles are reflected in the offset graph 220. Changes to the depth of subtitles can also be shown in the positions of the subtitles in the video preview display area 210. The offset graph is aligned with a timeline 240.

The interface 200 further comprises one or more subtitle tracks 242. The subtitle tracks 242 are visual representations of the subtitle events in the subtitle event table 230. The subtitle tracks 242 are also aligned with the timeline 240.

The interface 200 further comprises a video track 250. The video track 250 represents stereoscopic media in which the subtitles are being adjusted. The video track 250 is also aligned with the timeline 240.

Figure 3:
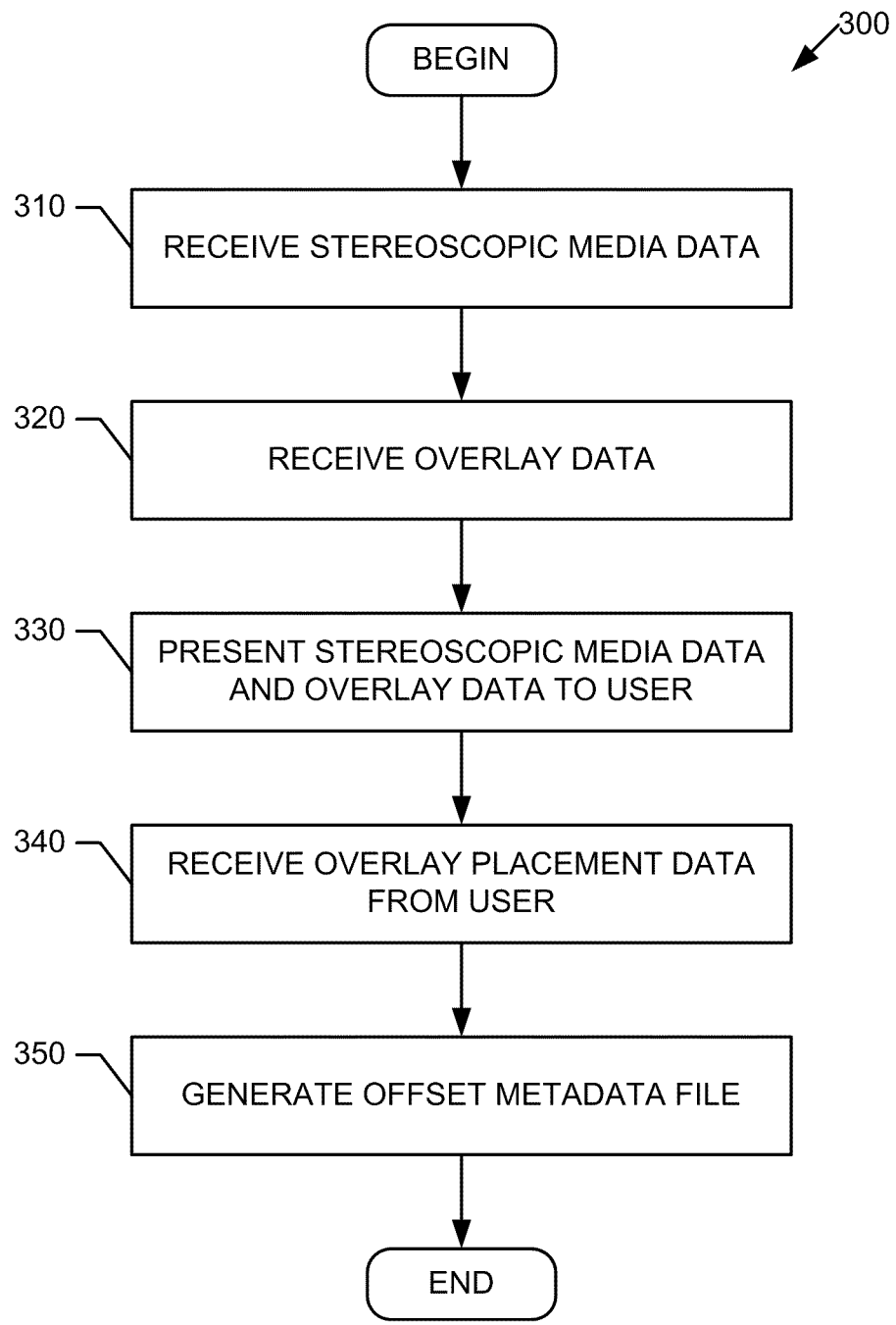
FIG. 3 is a flowchart illustrating a technique of positioning subtitles in accordance with one implementation of the present invention.

FIG. 3 is a flowchart illustrating a method 300 of positioning overlays in accordance with one implementation of the present invention. In one implementation, the method 300 may be implemented on the computer system 100 of FIG. 1. In particular, the method 300 may be implemented as part of the overlay positioning system 190 of FIG. 1.

At step 310, the system 100 receives stereoscopic media data. In one implementation, the stereoscopic media data may be retrieved from storage 130, the media device 140, or the network 170 of the computer system 100. Stereoscopic media can be side-by-side encoded using the MPEG-2 codec in a Transport Stream container. Alternatively, for example, if the media is encoded in a pre-processing step, Moving Pictures Experts Group 4 (MP4) or Material Exchange Format (MXF) containers may be used. Video media may be of resolutions such as 1920×1080 or 1280×720. The resolution of the media may be used to determine the overlay positioning. For example, overlay positions may not be allowed to exceed an amount based on the resolution of the media. If embedded audio is included, it too can be imported. If separate audio is available, it can also be imported and manually synchronized to the source video. Audio media may use any format, including, but not limited to: WAV, BWF, AIFF, FLAC, OGG, or MP3. Multiple source media files may be imported, and aligned to the timecode in a Blu-ray Disc Navigation (BDN) subtitle file.

Continuing at step 320, the computer system 100 receives the overlay data. In one implementation, the overlay data may be retrieved from storage 130, the media device 140, the network 170 of the computer system 100, or from another source.

In one implementation, the user imports subtitles by pushing a button (not shown) in the interface 200 of FIG. 2 and selecting a BDN Blu-ray subtitle file. This file has references to subtitle graphic files and also their start and end positions in time. The system 100 creates new subtitle tracks 242 and creates subtitle events on these new tracks. The events are also represented in the subtitle event table 230. In one implementation, two tracks are used, one for the left eye and one for the right eye. They are automatically scaled and offset to be composited over both the left eye and right eye images of the side-by-side stereoscopic source media. An additional pair of tracks is created if any of the subtitles overlap in time.

In another implementation, the overlay positioning system 190 allows for the creation of BDN subtitle data from within the application rather than importing the overlay data from an existing BDN.xml file. The user can define the general project properties frame-rate and resolution, and generate overlay images by defining individual properties, such as the start time, the end time, and the position. In this implementation, the actual overlay images can be either imported from existing graphics or created by the operator by entering the text, defining font, size, and other properties such as the font outline and the position of the overlay.

In one implementation, the overlay positioning system 190 includes an overlay adjustment interface configured to adjust the position of the overlay in at least one preview image based on an input from the user related to the depth value of the overlay.

In one implementation, only graphic events from the BDN file are imported, and text events are ignored. In another implementation, both graphic events and text events are used. In another implementation, only text events are used.

In one implementation, in ranges of time where subtitles do not exist, or when no BDN source is available, an optional placeholder graphic is shown instead. This is used to set depth in these areas, should the offset stream be used by other subtitles or interactive graphics layers.

While the BDN file type has been discussed, it will be appreciated that other file types representing subtitle data may also be used. For example, XML file types may be used.

Continuing at step 330, the stereoscopic media data and overlay data are presented to the user. In one implementation, the media and overlays such as subtitles are presented to the user via the interface 200 of FIG. 2 using the computer system 100 of FIG. 1. For example, the interface 200 is shown on a monitor of the system 100 and seen in 2D. Audio is delivered using an audio subsystem of the system 100. In another implementation, the media and overlays such as subtitles are presented to the user using the stereoscopic display 105 of FIG. 1. For example, the media and subtitles are output via a compatible video card with HDMI (or DVI) output to a stereoscopic-capable 3D displays. With the display in 3D mode, the content is shown in stereoscopic 3D, with subtitles superimposed using their current offset, and the viewer sees depth when wearing the 3D glasses.

In another implementation, a combination of the system 100 and the monitor 105 may be used. Advantageously, the efficiency of adjusting overlay position can be enhanced by providing both a monitor having a 2D interface 200 and a separate stereoscopic display 105 having a stereoscopic view of the media and overlays such as subtitles.

In one implementation, a user can position a playback cursor anywhere in the media file either through direct manipulation (dragging the cursor or clicking in the timeline), or by typing in absolute or relative timecode values. In another implementation, the user can step forward or backward frame by frame using an input device such as a keyboard or a compatible jog/shuttle device such as the Contour Design ShuttlePro and the PreSonus Faderport Unit.

In one implementation, the user can playback at normal speed, and at full frame rate. For example, playback can be started with Spacebar or Enter, and can be stopped (and rewound) using Spacebar, or paused at the current location using Enter. GUI controls (not shown) may also be used for these.

The user can also playback at less than full speed (e.g., 0.25×, 0.5×, forward or reverse), or shuttle play at speeds greater than 1× (e.g., 2×, 4×, forward or reverse). In one example, this is done using the "JKL" keys on the keyboard, or GUI controls, or compatible jog/shuttle device such as the ShuttlePro.

In another implementation, GUI buttons in the interface 200 will jump to the next (or previous) subtitle event.

Continuing at step 340, the computer system 100 receives placement data from a user. The placement data may also be referred to as offset data. The subtitle placement data/value may be received in various ways. In one implementation, each subtitle event may have a default subtitle placement value. Alternatively, the source file for the subtitle events may store a placement value for each event. Each placement value may include an X value, a Y value, and a depth value. Other offset value representations may also be used. While paused or during playback, the user may adjust the placement values of the subtitle events.

In one implementation, a user may use an input device such as a keyboard to make relative adjustments. For example, two keys, such as the up and down keys, are assigned for moving the subtitle in or out of the screen. Modifier keys can be used for finer or coarser control. For example, holding shift while pressing the up key may move the subtitle a greater distance per key press.

In another implementation, an input device, such as a keyboard, may be used to provide absolute placement values. For example, a numeric readout of the current offset, e.g., (X value, Y value, depth value) may be shown in the interface 200. These and other values can be edited to set an absolute placement value.

In another implementation, an input control device such as a mouse wheel may be used to adjust placement values. For example, rolling the mouse wheel away from the user pushes the subtitle deeper and rolling the mouse wheel towards the user brings the subtitle nearer. It may be a requirement that the mouse is positioned over the interface 200 for the mouse wheel to work for depth adjustments.

In another implementation, if a compatible control surface with a motorized fader is attached, such as the PreSonus FaderPort Unit that has built-in human touch sensitive control surfaces, the fader moves to match the current offset value. When the user touches the fader, the user's movement of the fader is recorded as new offset information. Thus, this touch sensitive action allows for the system to engage the record functions of the application when a user touch is detected and disengages the record functions when the user touch is released. Offsets recorded using a control surface fader can be automatically smoothed when the fader is released.

Figure 4A:
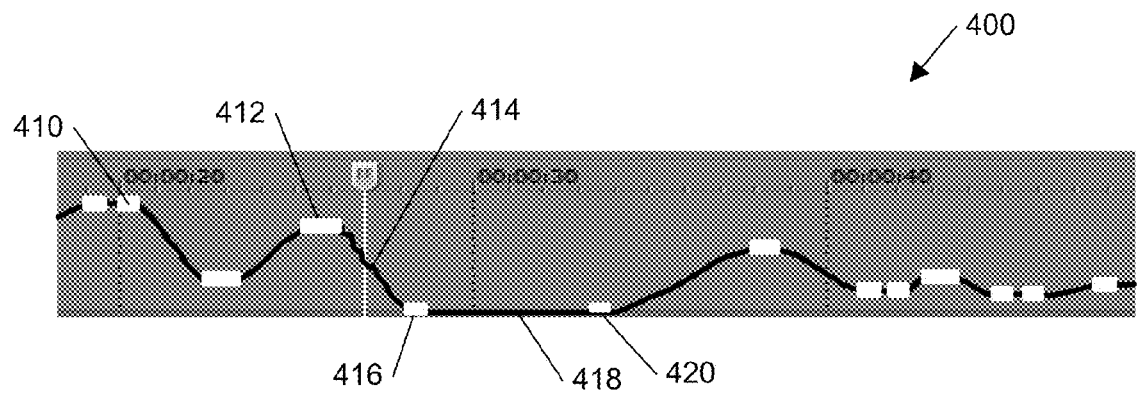
FIG. 4A illustrates a representation of an interface of a system for use in positioning subtitles in accordance with one implementation of the present invention.

In another implementation, the user may provide placement data by manipulation of subtitle offset graph 220 of FIG. 2. FIG. 4A illustrates one view of a portion of an offset graph 400, which is sometimes referred to as an envelope. The horizontal axis represents time and may correspond to a portion of the timeline 240 of FIG. 2. The vertical axis represents a placement value, such as a depth value. The graph 400 includes handles 410, 412, 416, and 420. The handles represent recorded placement values. For example, if a user enters an absolute placement value for a subtitle at a particular time in the timeline, the value is represented as a handle. The graph 400 also includes transitions, such as the transitions 414 and 418. In one implementation, the subtitle offset value is continuous in that it has a value at each point on the timeline. The transition between recorded handles may be interpolated using smooth curves or other types of curves.

In addition to the other offset editing methods, the user may directly manipulate the handle points, for example, moving them in time or value, adding new handles, or removing handles. Furthermore, transitions can be drawn directly, with automatic smoothing. In one example, the offset data of a theatrical cut can be adjusted to fit an extended cut using direct transition manipulation by inserting time for the additional scenes. Transition data can also be cut/copied/pasted within or between different projects.

Figure 4B:
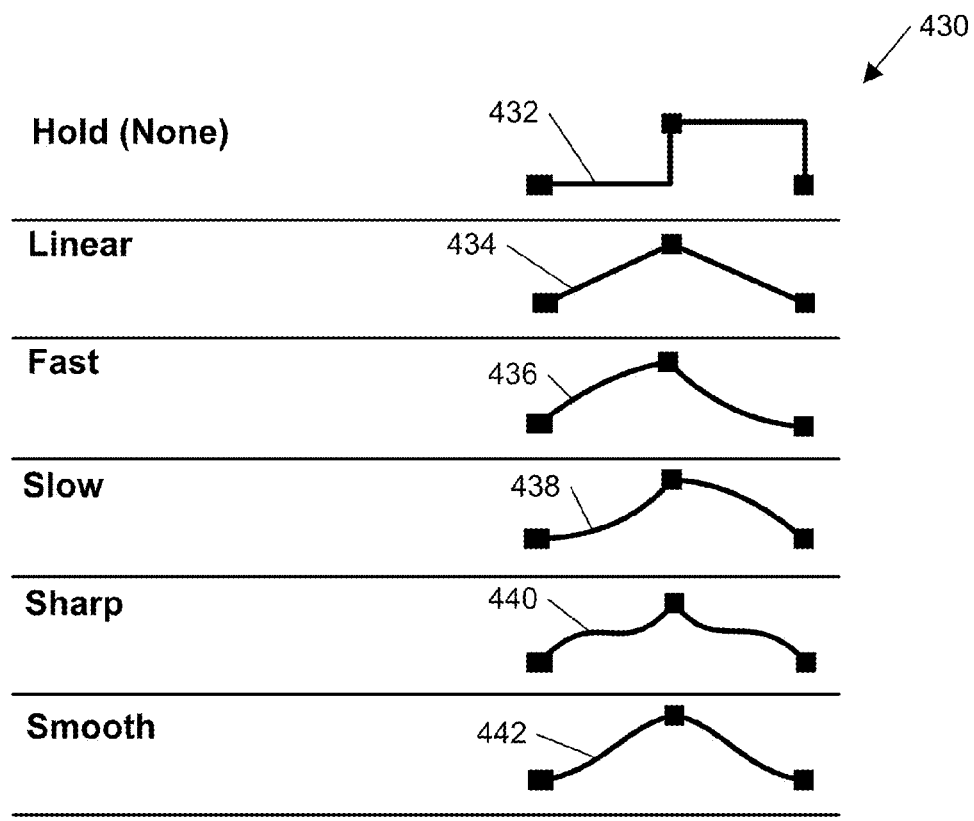
FIG. 4B illustrates graphical representations of effects for use in positioning subtitles in accordance with an implementation of the present invention.

FIG. 4B illustrates a set of predefined transition shapes 430. In one implementation, a user can select one of the shapes as a transition between handles in the graph 400. As shown, the transitions include a hold 432, linear 434, fast 436, slow 438, sharp 440 and smooth 442 curves. Each curve advantageously provides a different visual user experience. The user may define other shapes for transitions as well.

As part of the input process, a user may preview offset data as well as record offset data. In one implementation, a user may select a preview mode or a record mode corresponding to these two types of activity. In preview mode, the input device is ignored and existing offset data is used. In record mode, the input device is active and subtitles are offset using the values from the input device, which are also recorded. While recording, the 3D display updates in real time as adjustments are made.

In one implementation, minimum and maximum offset values are stored into a preferences profile. Users can create new profiles, modify existing profiles, and select from the available profiles. Each project can store the settings from the selected preference profile. The offset adjustment can be limited to stay within this range.

In addition to being able to re-write offset values at any time, "undo" and "redo" commands are available for getting back to a previous state. The commands may be entered directly via an input device such as a keyboard or via buttons on the interface 200.

While depth values have been discussed, it will also be appreciated that the systems and methods described may also be used for manipulating X and Y positions as well. For example, where stand-in subtitles are used, a user may position a subtitle over a certain portion of the video. In another implementation, a user may reposition an actual subtitle in order to avoid part of the video. Input mechanisms and the user interface may be used to reposition X-Y coordinates of the subtitle to facilitate the user preferences.

Returning to FIG. 3, at step 350, the computer system 100 generates an offset metadata file. The computer system may generate the file in response to user input via an input device such as a keyboard or via buttons on the interface 200. For example, after completing the process of adjusting the depths via the interface 200, the user can select to generate the offset metadata file. In one implementation, the offset metadata file comprises a stream of offset values where each offset value corresponds to a particular frame of video in the source media. If multiple, source media files are combined into a single timeline, the offset metadata file may comprise a stream of offset values for each source media. In another implementation, the offset metadata file may be included or embedded in the media stream.

A user's work on a project may be saved in various stages of completion. For example, the layout as represented by interface 200 may be saved. Alternatively, the completed offset metadata file may also be saved. In either case, the saved state of the project may be loaded and further edited or modified.

In one implementation, the overlay positioning system 190 is capable of recognizing and communicating with external control devices such as the PreSonus FaderPort Unit that has built-in human touch sensitive control surfaces. This touch sensitive action allows for the system 190 to engage the record functions of the application when a human touch is detected and disengages the record functions when the human touch is released.

Figure 5:
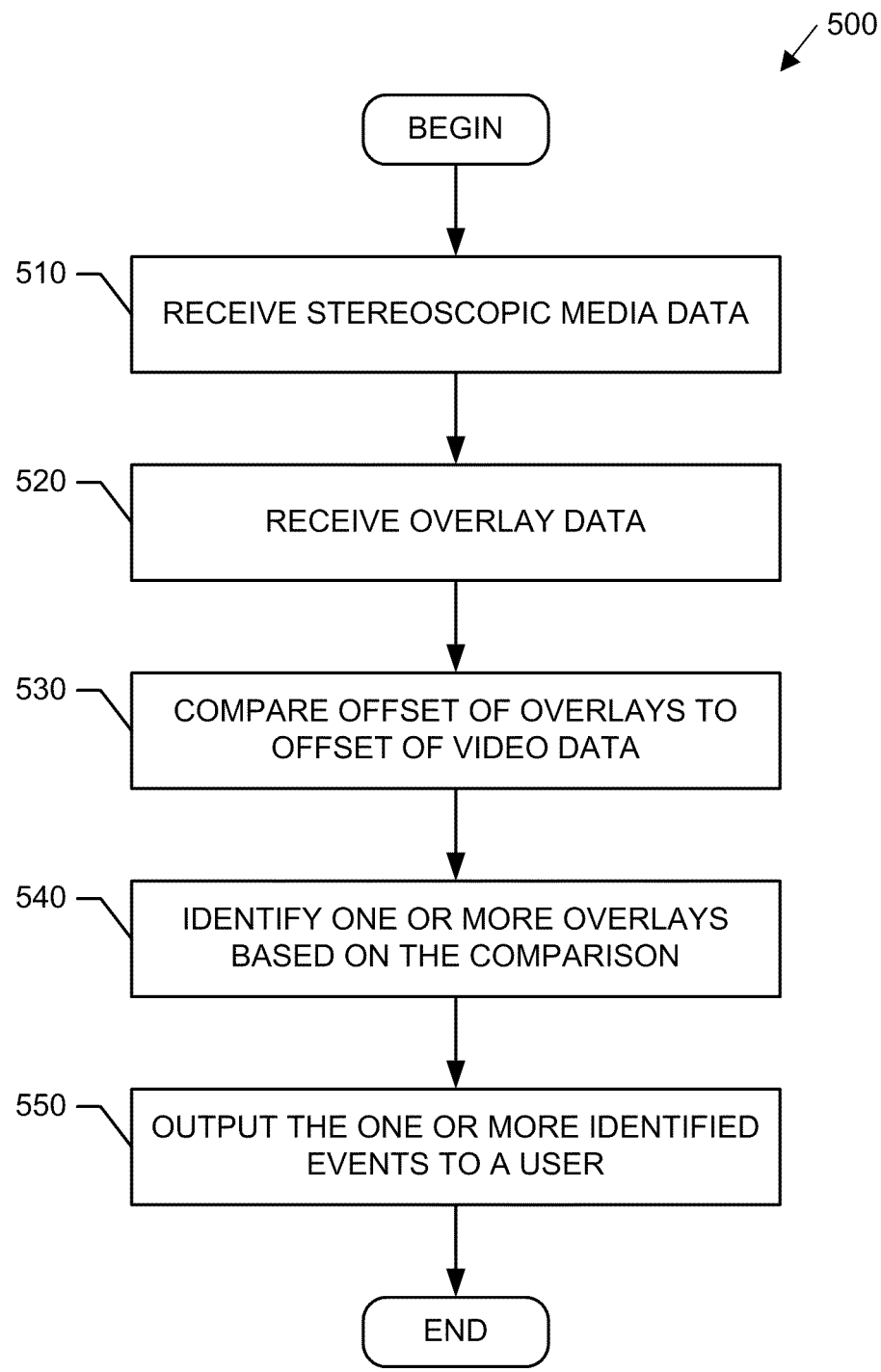
FIG. 5 is a flowchart illustrating a technique of identifying subtitles that may be repositioned in accordance with one implementation of the present invention.

FIG. 5 is a flowchart illustrating a method 500 of automatically identifying overlays such as subtitles that may need to be repositioned. The method 500 may be performed by the computer system 100 of FIG. 1B. In some implementations, it may be desirable to reposition overlays where the overlays have lesser depth values than the image objects in the same area of the video. In such a case, the overlays may be buried or visually obscured by the image objects. In one implementation, the method 500 provides for automatically detecting such depth issues.

At step 510, the computer system 100 receives stereoscopic media data. The media data represents the video. At step 520, the computer system 100 receives overlay data. The overlay data includes offset values for subtitles.

Continuing at step 530, the computer system 100 compares the offset information for the video data with the offset information for the overlays. For example, the system can determine if the depth value for the overlay is greater than, less than, or equal to the depth value for the video data in the area of the overlay. In one implementation, a stereoscopic correspondence function may be used to determine the offset values for the source video.

Continuing at step 540, the computer system 100 identifies one or more overlays based on the comparison. As described above, the computer system may identify the set of overlays that are deeper than video objects in the same area, i.e., where the depth value of the overlay is less than the depth value of the video objects in the same area. Other criteria for identification may also be used. For example, the system may identify overlays where the depth value of the overlay is within a predetermined threshold amount of the depth value of the video objects in the same area.

Continuing at step 550, the system 100 outputs the one or more identified overlay events to a user. For example, the system may generate a window in the interface 200 listing the identified overlays. Alternatively, the interface 200 may place a visual indicator such as a red flag next to identified events in the event table 230. Other notification schemes may also be used.

In another implementation, the system 100 may automatically adjust the offset values of the identified overlay events. For example, the system 100 may change the offset value of the identified overlays so that the depth of the identified overlay events is greater than or equal to the depth of the video objects in the same area. This automatic pass may advantageously reduce the amount of manual repositioning performed by a user.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of adjusting overlay positioning in stereoscopic video, the method comprising:
   receiving overlay data including a plurality of overlays, each overlay having a lateral axis value, a vertical axis value, and a depth value;
   receiving and displaying the stereoscopic video to a user as at least one of a video preview display and a stereoscopic display, each display including an overlay from the overlay data,
   wherein a position of the overlay in said each display is based on the lateral axis value, the vertical axis value, and the depth value of the overlay, and
   wherein the video preview display includes interfaces for adjusting the position of the overlay in said each display;
   receiving input from the user related to the depth value of the overlay; and
   adjusting the position of the overlay in the video preview display based on the input from the user,
   wherein the input from the user includes a pre-defined transition shape between a pair of handles for a change in the position of the overlay in one frame to the positions of the overlay in the subsequent frames of the stereoscopic video,
   wherein a handle is a recorded placement value of the overlay.

2. The method of claim 1, wherein the overlay data comprises subtitle data and the overlay comprises a subtitle.

3. The method of claim 1, further comprising
   determining an updated lateral axis value, an updated vertical value, and an updated depth value for the overlay based on said adjusting the position of the overlay; and
   generating output files comprising the updated lateral axis value, the updated vertical value, and the updated depth value for the overlay.

4. The method of claim 1, wherein the video preview display is displayed as at least one mode of side-by-side, top-bottom, checkerboard, left video and overlay data only, right video and overlay data only, and 3-D anaglyphic.

5. The method of claim 4, wherein the side-by-side mode displays a first image including a first overlay for a left eye adjacent to a second image including a second overlay for a right eye.

6. The method of claim 5, wherein a first position is defined for the first overlay in the first image and a second position is defined for the second overlay in the second image.

7. The method of claim 6, wherein a relative position between the first position and the second position provides a perceived depth of the overlay when displayed to the user.

8. The method of claim 4, wherein adjusting the position of the overlay in the video preview display comprises
   moving the overlay data of left video away from the overlay data of the right video to increase the depth value of the overlay.

9. The method of claim 1, wherein the overlay data comprises a BDN Blu-ray subtitle file.

10. The method of claim 1, wherein the overlay data is created within an overlay positioning system.

11. An overlay positioning system to display overlay data in stereoscopic video, the system comprising:
    a video preview display area configured to display the stereoscopic video to a user as at least one preview image, the video preview display area including an overlay from the overlay data,
    wherein the position of the overlay in said at least one preview image is based on a lateral axis value, a vertical axis value, and a depth value of the overlay; and
    an overlay adjustment interface configured to adjust the position of the overlay in said at least one preview image based on an input from the user related to the depth value of the overlay,
    wherein the input from the user includes a pre-defined transition shape between a pair of handles for a change in the position of the overlay in one frame to the positions of the overlay in the subsequent frames of the stereoscopic video, wherein a handle is a recorded placement value of the overlay.

12. The overlay positioning system of claim 11, further comprising
a stereoscopic display area configured to display the stereoscopic video with the overlay adjusted by the user.

13. The overlay positioning system of claim 11, further comprising
an overlay event table including overlay events describing when and how to display the overlay in the video preview display area,
wherein the overlay event table enables the user navigate between the overlay events in the video preview display area.

14. The overlay positioning system of claim 13, wherein overlay events comprise at least one of
an event index, a start time, a stop time, an identifier of the overlay being displayed, and other information related to display of the overlay.

15. The overlay positioning system of claim 14, wherein the other information comprises at least one of
cropping information, conditional display information, positioning information, sizing information, and effect information.

16. The overlay positioning system of claim 11, further comprising
an overlay offset graph configured to show the depth value of the overlay over time.

17. The overlay positioning system of claim 16, wherein the overlay adjustment interface comprises
a graph adjustment module configured to allow the position of the overlay to be adjusted by manipulating the overlay offset graph.

18. A non-transitory storage medium storing a computer program for adjusting overlay positioning in stereoscopic video, the computer program comprising executable instructions that cause a computer to:
receive overlay data including a plurality of overlays, each overlay having a lateral axis value, a vertical axis value, and a depth value;
receive and display the stereoscopic video to a user as at least one of a video preview display and a stereoscopic display, each display including an overlay from the overlay data,
wherein a position of the overlay in said each display is based on the lateral axis value, the vertical axis value, and the depth value of the overlay, and
wherein the video preview display includes interfaces for adjusting the position of the overlay in said each display;
receive input from the user related to the depth value of the overlay; and
adjust the position of the overlay in the video preview display based on the input from the user,
wherein the input from the user includes a pre-defined transition shape between a pair of handles for a change in the position of the overlay in one frame to the positions of the overlay in the subsequent frames of the stereoscopic video,
wherein a handle is a recorded placement value of the overlay.

19. The computer-readable medium of claim 18, wherein the overlay data comprises subtitle data and the overlay comprises a subtitle.

20. The computer-readable medium of claim 18, wherein the video preview display is displayed as at least one mode of side-by-side, top-bottom, checkerboard, left video and overlay data only, right video and overlay data only, and 3-D anaglyphic.

* * * * *